US012802967B2

(12) United States Patent

Jeon et al.

(10) Patent No.: US 12,802,967 B2
(45) Date of Patent: Nov. 17, 2026

(54) ANODE FOR SECONDARY BATTERY AND SECONDARY BATTERY INCLUDING THE SAME

(71) Applicant: SK ON CO., LTD., Seoul (KR)

(72) Inventors: Chan Young Jeon, Daejeon (KR); Hee Gyoung Kang, Daejeon (KR); So Hyun Park, Daejeon (KR); Hae Suk Hwang, Daejeon (KR)

(73) Assignee: SK ON CO., LTD., Seoul (KR)

( * ) Notice: Subject to any disclaimer, the term of this patent is extended or adjusted under 35 U.S.C. 154(b) by 805 days.

(21) Appl. No.: 17/887,403

(22) Filed: Aug. 12, 2022

(65) Prior Publication Data

US 2023/0068138 A1 Mar. 2, 2023

(30) Foreign Application Priority Data

Aug. 13, 2021 (KR) ........................ 10-2021-0107208

(51) Int. Cl.
*H01M 4/36* (2006.01)
*H01M 4/485* (2010.01)
(Continued)

(52) U.S. Cl.
CPC ........... *H01M 4/364* (2013.01); *H01M 4/485* (2013.01); *H01M 4/583* (2013.01);
(Continued)

(58) Field of Classification Search
CPC ...... H01M 10/052; H01M 4/36; H01M 4/364; H01M 4/485; H01M 4/583;
(Continued)

(56) References Cited

U.S. PATENT DOCUMENTS

2018/0083270 A1 3/2018 Takahashi
2020/0235383 A1* 7/2020 Shin et al. ............ H01M 4/364
2022/0336809 A1* 10/2022 Choi ..................... H01M 4/133

FOREIGN PATENT DOCUMENTS

EP 3675249 A1 7/2020
EP 4020623 A1 6/2022
(Continued)

OTHER PUBLICATIONS

Extended European Search Report for European Patent Application No. 22189784.6, mailed Dec. 12, 2022 (6 pages).
Notice of Allowance for Korean Patent Application No. 10-2021-0107208 issued by the Korean Patent Office on Jul. 6, 2026.

*Primary Examiner* — Kevin P Kerns
(74) *Attorney, Agent, or Firm* — IP & T GROUP LLP

(57) ABSTRACT

Secondary batteries including an anode and having improved capacity properties and stability are disclosed. In an aspect, an anode for a secondary battery includes first anode active material particles, each of the first anode active material particles having a single particle structure that includes a core particle and a coating layer formed on a surface of the core particle, and second anode active material particles having an average particle diameter greater than that of the first anode active material particles. A ratio of a weight of the first anode active material particles to a total weight of the first anode active material particles and the second anode active material particles is in a range from 50 wt % to 100 wt %.

20 Claims, 2 Drawing Sheets

(51) Int. Cl.
*H01M 4/583* (2010.01)
*H01M 10/052* (2010.01)
*H01M 4/02* (2006.01)

(52) U.S. Cl.
CPC .... *H01M 10/052* (2013.01); *H01M 2004/021* (2013.01); *H01M 2004/027* (2013.01); *H01M 2004/028* (2013.01)

(58) Field of Classification Search
CPC ..... H01M 2004/021; H01M 2004/027; H01M 2004/028
USPC ........................................... 429/218.1, 231.8
See application file for complete search history.

(56) References Cited

FOREIGN PATENT DOCUMENTS

| | | | |
|---|---|---|---|
| JP | 5927823 | B2 | 6/2016 |
| KR | 10-2017-0093754 | A1 | 8/2017 |
| KR | 10-2017-0099748 | A | 9/2017 |
| KR | 10-2018-0028797 | A | 3/2018 |
| KR | 10-2019-0076706 | A | 7/2019 |
| KR | 10-2019-0102612 | A | 9/2019 |
| KR | 10-2020-0073801 | A | 6/2020 |
| KR | 10-2021-0053061 | A | 5/2021 |

* cited by examiner

ANODE FOR SECONDARY BATTERY AND SECONDARY BATTERY INCLUDING THE SAME

PRIORITY CLAIM AND CROSS-REFERENCE TO RELATED APPLICATION

This patent document claims the priority and benefits of Korean Patent Application No. 10-2021-0107208 filed at the Korean Intellectual Property Office (KIPO) on Aug. 13, 2021, the entire disclosure of which is incorporated herein by reference.

TECHNICAL FIELD

This patent document generally relates to an anode for a secondary battery and a secondary battery including the same. More particularly, this patent document relates to an anode for a secondary battery including different types of particles and a secondary battery including the same.

BACKGROUND

The rapid growth of electric vehicles and portable devices, such as camcorders, mobile phones, and laptop computers, has brought increasing demands for secondary batteries which can be charged and discharged repeatedly. Examples of the secondary battery includes lithium secondary batteries, nickel-cadmium batteries, and nickel-hydrogen batteries. The lithium secondary batteries are now widely used due to their high operational voltage and energy density per unit weight, a high charging rate, a compact dimension, etc.

A lithium secondary battery may include an electrode assembly including a cathode, an anode and a separation layer (separator), and an electrolyte immersing the electrode assembly. The lithium secondary battery may further include an outer case having, e.g., a pouch shape.

For example, the anode may include a carbon-based active material or silicon-based active material particles as an anode active material. When the battery is repeatedly charged and discharged, side reactions may occur due to a contact with the electrolyte, and mechanical and chemical damage such as particle cracks may be caused.

With changes in composition and structure of the anode active material, the stability of the active material particles may be improved, whereas its conductivity may be degraded and a power of the secondary battery may be deteriorated.

Thus, developments are ongoing to improve the life-span stability and power/capacity properties of the anode active material.

SUMMARY

The technology disclosed in this patent document can be implemented in some embodiments to provide an anode for a secondary battery having improved stability and activity.

The technology disclosed in this patent document can also be implemented in some embodiments to provide a secondary battery having improved stability and activity.

The technology disclosed in this patent document can also be implemented in some embodiments to provide a method of fabricating an anode for a secondary battery having improved stability and activity.

An anode for a secondary battery based on some embodiments of the disclosed technology includes first anode active material particles in a form of a single particle, each of the first anode active material particles including a core particle and a coating layer formed on a surface of the core particle, and second anode active material particles having an average particle diameter greater than that of the first anode active material particles. A content ratio of the first anode active material particles is more than 50 wt % and less than 100 wt % based on a total weight of the first anode active material particles and the second anode active material particles.

In some embodiments, the core particle may include a graphite-based active material, an amorphous carbon-based material or a mixture of the graphite-based active material and the amorphous carbon-based material.

In some embodiments, the core particle may include artificial graphite.

In some embodiments, the coating layer may include an amorphous carbon-based material.

In some embodiments, the coating layer may be formed from pitch.

In some embodiments, the first anode active material particles may have a hardness higher than that of the second anode active material particles.

In some embodiments, a ratio of an average particle diameter of the first anode active material particles relative to the average particle diameter of the second anode active material particles may be in a range from 0.3 to 0.6.

In some embodiments, the second anode active material particle may include a graphite-based active material, an amorphous carbon-based material or a mixture of the graphite-based active material and the amorphous carbon-based material.

In some embodiments, an average sphericity (Dn50) of the first anode active material particles may be 0.91 or more.

In some embodiments, the second anode active material particles may include artificial graphite.

In some embodiments, the content ratio of the first anode active materials may be in a range from 60 wt % to 90 wt % based on the total weight of the first anode active material particles and the second anode active material particles.

A secondary battery based on some embodiments of the disclosed technology includes a cathode including a lithium metal oxide; and the anode for a secondary battery according to the above-described embodiments facing the cathode.

In some embodiments of the disclosed technology, an anode active material including a first anode active material particle having a coating layer formed on a core particle and a second anode active material particle may be used. The first anode active material particle including the coating layer to have a high hardness and the second anode active material particle having a relatively low hardness may be used together, so that rate properties of the anode active material may be improved. In some implementations, the rate properties may include rate capability that indicates a maximum charge/discharge rate of a battery or cell.

Further, the first anode active material particle and the second anode active material particle may be used together so that pressing properties and charging capacity of the anode active material may be improved.

In some embodiments of the disclosed technology, a mixing ratio of the first anode active material particles and the second anode active material particles may be adjusted so that the pressing and high rate properties of the anode active material may be further improved.

DETAILED DESCRIPTION

The technology disclosed in this patent document can be implemented in some embodiments to provide an anode for a secondary battery which includes a first anode active material particle and a second anode active material particle having different structures and shapes and a secondary battery including the anode for a secondary battery.

Hereinafter, the disclosed technology will be described in detail with reference to the accompanying drawings. However, such embodiments described with reference to the accompanying drawings should not be construed as limitations on the scope of any invention.

Figure 1:
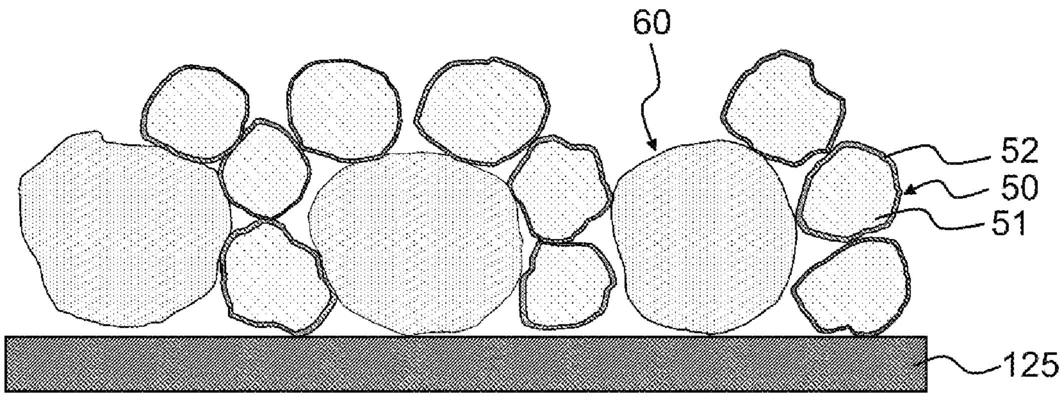
FIG. 1 is a schematic cross-sectional view illustrating an anode for a secondary battery based on some embodiments of the disclosed technology.

FIG. 1 is a schematic cross-sectional view illustrating an anode for a secondary battery based on some embodiments of the disclosed technology.

Referring to FIG. 1, an anode for a secondary battery may include an anode current collector 125 and an anode active material layer 120 (see FIG. 3) formed on the anode current collector 125.

The anode active material layer 120 may include an anode active material including a first anode active material particle 50 and a second anode active material particle 60. The anode active material may include a plurality of the first anode active material particles 50 and a plurality of the second anode active material particles 60.

In some embodiments of the disclosed technology, the first anode active material particles 50 and the second anode active material particles 60 may be include in an amount of 80 wt % or more, 85 wt % or more, 90 wt % or more, 95 wt % or more, or 98 wt % or more based on a total weight of the anode active material. In an embodiment, the anode active material may include the first anode active material particles 50 and the second anode active material particles 60.

The first anode active material particle 50 may include a core particle 51 and a coating layer 52 formed on a surface of the core particle 51.

The core particle 51 may serve as a particle that provides an activity to the anode. For example, the core particle 51 may include a graphite-based active material and/or an amorphous carbon-based material. In an embodiment, the core particle 51 may include the graphite-based material such as artificial graphite and/or natural graphite.

In some embodiments, the core particle 51 may include artificial graphite. Artificial graphite may have a smaller capacity than that of natural graphite, but may have relatively high chemical and thermal stability. Accordingly, storage stability or life-span properties of the secondary battery may be improved by employing artificial graphite as the core particle 51.

Additionally, the coating layer 52 may be formed on the surface of the core particle 51, so that a hardness of the first anode active material particle 50 may be improved, and sufficient electrolyte resistance, high temperature storage property and rate properties may be provided.

In some embodiments, the core particle 51 may include an amorphous carbon-based material. Examples of the amorphous carbon-based material include glucose, fructose, galactose, maltose, lactose, sucrose, a phenolic resin, a naphthalene resin, a polyvinyl alcohol resin, a urethane resin, a polyimide resin, a furan resin, a cellulose resin, an epoxy resin, a polystyrene resin, a resorcinol-based resin, a phloroglucinol-based resin, a coal-based pitch, a petroleum-based pitch, tar, a low molecular weight heavy oil, etc. These may be used alone or in combination thereof.

In an embodiment, the core particle 51 may include a mixture of the graphite-based active material and the amorphous carbon-based material.

The coating layer 52 may be formed from an amorphous carbon-based material. In an embodiment, the coating layer 52 may be formed from pitch. Example of pitch may include a coal-based pitch, a mesophase pitch, a petroleum-based pitch, etc. The coating layer 52 formed from pitch may include a pitch carbide, a mesophase pitch carbide, soft carbon, hard carbon or a combination thereof.

An average particle diameter ($D_{50}$) of the core particles 51 may be in a range from about 1 μm to about 11 μm. $D_{50}$ may refer to a particle diameter at 50% by volume in a cumulative particle size distribution. In an embodiment, the average particle diameter ($D_{50}$) of the core particles 51 may be in a range from about 4 μm to 10 μm. In the above range, pressing and capacity properties may be sufficiently improved when mixed with the second anode active material particle 60.

In some embodiments, the coating layer 52 may be formed on at least a portion of the surface of the core particle 51. In an embodiment, the coating layer 52 may be distributed on the surface of the core particle 51 in the form of islands separated from each other. In an embodiment, an outer surface of the core particle 51 may be substantially entirely surrounded by the coating layer 52.

In some embodiments, a thickness of the coating layer 52 may be in a range from about 0.001 μm to 1 μm. In one example, the thickness of the coating layer 52 may be in a range from 0.001 μm to 0.1 μm. In another example, the thickness of the coating layer 52 may be in a range from 0.001 μm to 0.05 μm. The above thickness range may help to suppress damage to the first anode active material particles 50 while being pressed, and preserve high rate and capacity properties from the core particles 51 even after the pressing. Accordingly, the high rate and capacity properties of the anode active material may be improved.

In some embodiments, a content of the coating layer 52 may be in a range from 0.5 parts by weight to 3 parts by weight based on 100 parts by weight of the first anode active material particles 50. In the above content range, high-temperature storage property and thermal stability derived from the core particle 51 may be sufficiently achieved without deteriorating the rate properties of the first anode active material particles 50.

The coating layer 52 may cover the core particle 51, so that side reaction, oxidation, corrosion, cracks, etc., on the surface of the core particle 51 may be reduced or prevented. For example, mechanical and chemical damage of the surface of the core particle 51 caused when charging/discharging of the secondary battery is repeated may be suppressed or reduced.

Further, a gas generation that would have occurred due to a side reaction between the core particle 51 and the electrolyte may be prevented. In some embodiments of the disclosed technology, the coating layer 52 may protect the surface of the core particle 51, thereby suppressing chemical damage and side reactions that would have occurred due to a direct contact with the electrolyte.

Additionally, expansion of the core particle 51 may be relieved or suppressed by the coating layer 52. Accordingly, it is possible to suppress cracks that would have occurred in the particles due to swelling and expansion of the core particles 51 during the repeated charging/discharging.

In some embodiments, a sphericity of the first anode active material particles 50 may be 0.90 or more, for example, 0.91 or more. Within the above sphericity range, uniformity of the coating layer may be improved and a hardness of the first anode active material particles may be improved.

Accordingly, stress caused by the pressing may be effectively dispersed by the first anode active material particles, and the high rate and storage properties of the anode active material may be further improved.

The sphericity may be inferred from a ratio (an aspect ratio) of a minor axis to a major axis of the first anode active material particle 50. Further, the sphericity may be measured using a particle shape analyzer. For example, a cumulative distribution of the sphericity of the particles to be measured is derived using the particle shape analyzer, and a sphericity of a particle corresponding to a 50% distribution ratio from larger sphericity particles may be determined as the sphericity of the first anode active material particle.

The second anode active material particle 60 may include the aforementioned graphite-based material or amorphous carbon-based material. The graphite-based material may include artificial graphite and/or natural graphite.

The second anode active material particles 60 may have a spherical shape, a flake shape, an amorphous shape, a plate shape, a rod shape, a polyhedral shape, or a mixed shape thereof. In an embodiment, the second anode active material particles 60 may have a spherical shape. In this case, the pressing and capacity properties may be improved when being mixed with the first anode active material particles 50 including the coating layer 52.

The second anode active material particles 60 may be in the form of a single particle or an assembly of two or more single particles. The second anode active material particles 60 in the form of the assembly may further include a binder derived from pitch.

In some embodiments, an average particle diameter of the second anode active material particles 60 may be in a range from 14 μm to 18 μm. In the above particle size range, e.g., compatibility with the first anode active material particles 50 may be improved, and a sufficient pellet density may be provided after the pressing by an buffer action of the second anode active material particles 60.

In some embodiments, the hardness of the first anode active material particles 50 may be greater than that of the second anode active material particles 60. The hardness of the first anode active material particle 50 may be increased by the coating layer 52 formed on the surface of the core particle 51.

Thus, destruction of the first anode active material particle 50 may be suppressed during the pressing, and power and capacity properties of the core particle 51 may be maintained even after the pressing.

In an embodiment, the average particle diameter of the second anode active material particles 60 may be greater than the average particle diameter of the first anode active material particles 50 including the coating layer 52 on the surface thereof. Under the above-described conditions, a pellet density of the anode active material may be maintained or improved even after the pressing.

In some embodiments, a ratio of the average particle diameter of the first anode active material particles 50 relative to the average particle diameter of the second anode active material particles 60 may be in a range from 0.3 to 0.6.

In the above ratio range, a pressure applied during the pressing may be appropriately buffered by the second anode active material particles 60, and a proper packing of the first anode active material particles 50 may be implemented.

Further, pores formed between the first anode active material particles 50 and the second anode active material particles 60 may not be excessively clogged, so that the pellet density and power properties of the anode active material may be improved and balanced. Accordingly, the storage and rate properties of the anode active material may be effectively improved.

The pellet density may be used as an index indicating the hardness of the particle to be measured. For example, the pellet density of the first anode active material particles 50 may be used as an index indicating the hardness of the first anode active material particles 50, and the pellet density of the second anode active material particles 60 may be used as an index indicating the hardness of the second anode active material particles 60. In some embodiments of the disclosed technology, a higher pellet density of the particles may be interpreted that a measurement sample has a lower hardness.

The pellet density may be measured using a density meter. For example, the measurement sample may be compressed into a pellet shape, and then the pellet density may be measured using the density meter.

In an embodiment, the pellet density of the first anode active material particles 50 may be 1.6 g/cc (4 Kn) or less, and the pellet density of the second anode active material particles 60 mixed with the first anode active material particle 50 may exceed 1.6 g/cc (4 kN).

In the above pellet density range, the second anode active material particles 60 having a relatively large average particle diameter may provide a buffer activity during the pressing, and the power properties of the first anode active material particles 50 having a relatively small average particle diameter and high hardness may be maintained even after the pressing. Thus, the capacity and high-rate properties of an electrode may be improved and maintained even after the pressing.

In some embodiments of the disclosed technology, the first anode active material 50 may have a single particle shape including the core particle 51 and the coating layer 52 formed on the surface of the core particle 51. The second anode active material particles 60 may have a larger average particle diameter than that of the first anode active material particles 50.

A content of the first anode active material particles 50 may exceed 50 weight percent (wt %) based on a total weight of the first and second anode active material particles. In the above range, the storage and high-rate properties of the anode or the anode active material may be improved.

In an embodiment, the content of the first anode active material 50 may be 60 wt % or more, for example, 70 wt % or more.

In some embodiments, the content of the first anode active material particles 50 may be 99 wt % or less, preferably 90 wt % or less. Within the above range, the storage and high-rate charging properties of the anode or the anode active material may be improved.

If the content of the first anode active material particles 50 is 50 wt % or less, the power properties may be deteriorated due to an insufficient amount of the core particles 51. If the content of the first anode active material 50 is 100 wt %, a high-pressure pressing condition may be required to form the anode active material layer, and a pore structure of the anode active material layer may be damaged. Accordingly, the storage and rate properties may be deteriorated.

In some embodiments of the disclosed technology, the anode for a secondary battery may be fabricated by methods and processes as described below.

For example, the core particles 51 including the graphite-based active material as described above may be prepared. Thereafter, the coating layer 52 may be formed on the core particles 51.

The coating layer 52 may be formed by a dry or wet coating method. In the case of using the wet coating method, pitch particles and the core particles 51 may be mixed and stirred. Thereafter, the pitch particles may be uniformly adsorbed to the surface of the core particles 51 through a heat treatment.

After the coating layer 52 is formed on the first anode active material particles 50, the first anode active material particles 50 and the second anode active material particles 60 may be mixed. In the mixing, a physical contact between the first anode active material particles 50 may be increased. In the mixing, a physical contact between the first anode active material particles 50 and the second anode active material particles 60 may also be increased. An agitation may be appropriately performed so that the first anode active material particles 50 and the second anode active material particles 60 may be uniformly mixed.

The mixed and stirred first anode active material particles 50 and second anode active material particles 60 may be coated on the anode current collector, and then pressed by, e.g., a roll press.

Figure 2:
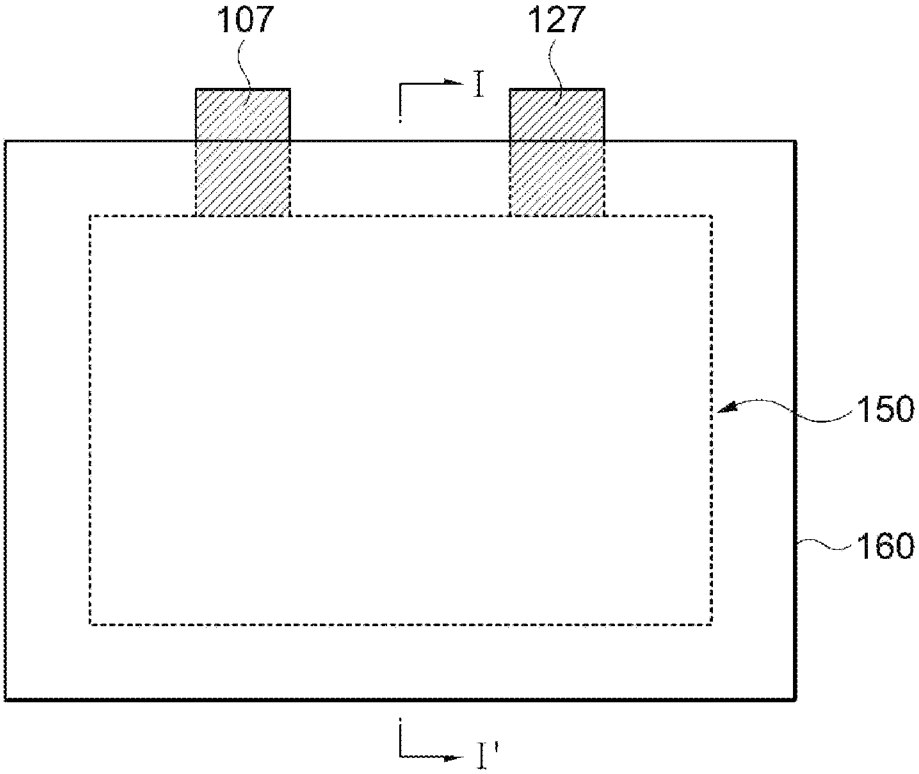
FIG. 2 is a schematic top plan view illustrating a secondary battery based on some embodiments of the disclosed technology.
Figure 3:
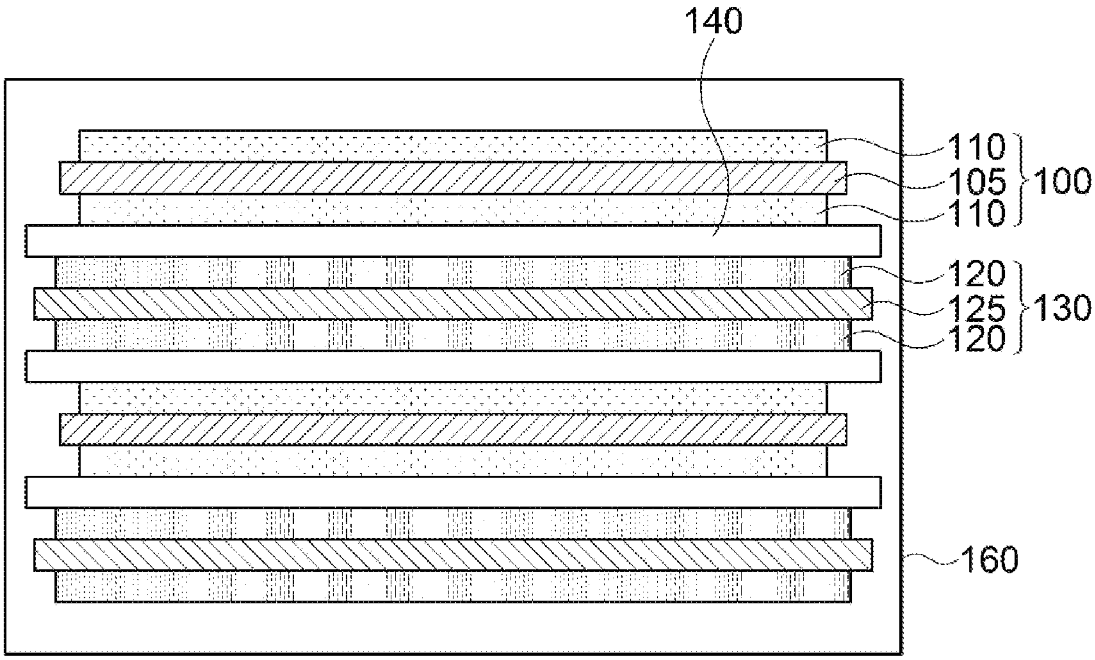
FIG. 3 is a schematic cross-sectional view illustrating a secondary battery based on some embodiments of the disclosed technology.

FIG. 2 is a schematic plan view illustrating a secondary battery based on some embodiments of the disclosed technology. FIG. 3 is a schematic cross-sectional view illustrating a secondary battery based on some embodiments of the disclosed technology. For example, FIG. 3 may be a cross-sectional view taken along a line I-I' of FIG. 2 in a thickness direction of the secondary battery.

Referring to FIGS. 2 and 3, the secondary battery may be a lithium secondary battery. In some embodiments of the disclosed technology, the secondary battery may include the electrode assembly 150 and a case 160 accommodating the electrode assembly 150. The electrode assembly 150 may include a cathode 100, an anode 130 and a separation layer 140.

The cathode 100 may include a cathode current collector 105 and a cathode active material layer 110 formed on at least one surface of the cathode current collector 105. In some embodiments of the disclosed technology, the cathode active material layer 110 may be formed on both surfaces (e.g., upper and lower surfaces) of the cathode current collector 105. For example, the cathode active material layer 110 may be coated on each of the upper and lower surfaces of the cathode current collector 105, and may be directly coated on the surface of the cathode current collector 105.

The cathode current collector 105 may include stainless-steel, nickel, aluminum, titanium, copper or an alloy thereof. Preferably, aluminum or an alloy thereof may be used.

The cathode active material layer 110 may include a lithium metal oxide as a cathode active material. In some embodiments of the disclosed technology, the cathode active material may include a lithium (Li)-nickel (Ni)-based oxide.

In some embodiments, the lithium metal oxide included in the cathode active material layer 110 may be represented by Chemical Formula 1 below.

[Chemical Formula 1]

$$Li_{1+a}Ni_{1-(x+y)}Co_xM_yO_2$$

In the Chemical Formula 1 above, $-0.05 \le a \le 0.15$, $0.01 \le x \le 0.2$, $0 \le y \le 0.2$, and M may include at least one element selected from Mn, Mg, Sr, Ba, B, Al, Si, Ti, Zr and W. In an embodiment, $0.01 \le x \le 0.20$, $0.01 \le y \le 0.15$ in Chemical Formula 1.

Preferably, in Chemical Formula 1, M may be manganese (Mn). In this case, nickel-cobalt-manganese (NCM)-based lithium oxide may be used as the cathode active material.

For example, nickel (Ni) may serve as a metal related to a capacity of a lithium secondary battery. As the content of nickel increases, capacity of the lithium secondary battery may be improved. However, if the content of nickel is excessively increased, life-span may be decreased, and mechanical and electrical stability may be degraded.

For example, cobalt (Co) may serve as a metal related to conductivity or resistance of the lithium secondary battery. In an embodiment, M may include manganese (Mn), and Mn may serve as a metal related to mechanical and electrical stability of the lithium secondary battery.

Capacity, power, low resistance and life-span stability may be improved together from the cathode active material layer 110 by the above-described interaction between nickel, cobalt and manganese.

For example, a slurry may be prepared by mixing and stirring the cathode active material with a binder, a conductive material and/or a dispersive agent in a solvent. The slurry may be coated on the cathode current collector 105, and then dried and pressed to form the cathode active material layer 110.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 110 may be reduced, and an amount of the cathode active material or lithium metal oxide particles may be relatively increased. Thus, capacity and power of the lithium secondary battery may be further improved.

The conductive material may be added to facilitate electron mobility between active material particles. For example, the conductive material may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In some embodiments, an electrode density of the cathode 100 may be in a range from 3.0 g/cc to 3.9 g/cc, preferably from 3.2 g/cc to 3.8 g/cc.

The anode 130 may include an anode current collector 125 and an anode active material layer 120 formed on at least one surface of the anode current collector 125. In some embodiments of the disclosed technology, the anode active material layer 120 may be formed on both surfaces (e.g., upper and lower surfaces) of the anode current collector 125.

The anode active material layer 120 may be coated on each of the upper and lower surfaces of the anode current collector 125. For example, the anode active material layer 120 may directly contact the surface of the anode current collector 125.

The anode current collector 125 may include gold, stainless steel, nickel, aluminum, titanium, copper, or an alloy thereof, preferably may include copper or a copper alloy.

In some embodiments of the disclosed technology, the anode active material layer 120 may include the anode active material according to the above-described embodiments. The anode active material may include the first anode active material particles 50 and the second anode active material particles 60.

For example, the anode active material may be included in an amount ranging from 80 wt % to 99 wt % based on a total weight of the anode active material layer 120. Preferably, the amount of the anode active material may be in a range from 90 wt % to 98 wt % based on the total weight of the anode active material layer 120.

For example, an anode slurry may be prepared by mixing and stirring the anode active material with a binder, a conductive material and/or a dispersive agent in a solvent. The anode slurry may be applied (coated) on the anode current collector 125, and then dried and pressed to form the anode active material layer 120.

The binder and the conductive material substantially the same as or similar to those used for forming the cathode 100 may be used in the anode 130. In some embodiments, the binder for forming the anode 130 may include, e.g., styrene-butadiene rubber (SBR) or an acrylic binder for compatibility with the graphite-based active material, and carboxymethyl cellulose (CMC) may also be used as a thickener.

In some embodiments of the disclosed technology, an electrode density of the anode active material layer 120 may be 1.4 g/cc to 1.9 g/cc.

In some embodiments, an area and/or a volume of the anode 130 (e.g., a contact area with the separation layer 140) may be greater than that of the cathode 100. Thus, lithium ions generated from the cathode 100 may be easily transferred to the anode 130 without a loss by, e.g., precipitation or sedimentation to further improve power and capacity of the secondary battery.

The separation layer 140 may be interposed between the cathode 100 and the anode 130. The separation layer 140 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer 140 may also include a non-woven fabric formed from a glass fiber with a high melting point, a polyethylene terephthalate fiber, or the like.

The separation 140 may extend in a width direction of the secondary battery between the cathode 100 and the anode 130, and may be folded and wound along the thickness direction of the lithium secondary battery. Accordingly, a plurality of the anodes 100 and the cathodes 130 may be stacked in the thickness direction using the separation layer 140.

In some embodiments of the disclosed technology, an electrode cell may be defined by the cathode 100, the anode 130 and the separation layer 140, and a plurality of the electrode cells may be stacked to form the electrode assembly 150 that may have e.g., a jelly roll shape. For example, the electrode assembly 150 may be formed by winding, laminating or folding the separation layer 140.

The electrode assembly 150 may be accommodated together with an electrolyte in the case 160. The case 160 may include, e.g., a pouch, a can, etc.

In some embodiments of the disclosed technology, a non-aqueous electrolyte may be used as the electrolyte.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3^-$, $CF_3(CF_2)_7SO_3^-$, $CF_3CO_2^-$, $CH_3CO_2^-$, $SCN^-$, $(CF_3CF_2So_2)_2N^-$, etc.

The organic solvent may include, e.g., propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination of two or more therefrom.

As illustrated in FIG. 2, electrode tabs (a cathode tab and an anode tab) may protrude from the cathode current collector 105 and the anode current collector 125 included in each electrode cell to one side of the case 160. The electrode tabs may be welded together with the one side of the case 160 to be connected to an electrode lead (a cathode lead 107 and an anode lead 127) that may be extended or exposed to an outside of the case 160.

FIG. 2 illustrates that the cathode lead 107 and the anode lead 127 are positioned at the same side of the lithium secondary battery or the case 160, but the cathode lead 107 and the anode lead 127 may be formed at opposite sides to each other.

For example, the cathode lead 107 may be formed at one side of the case 160, and the anode lead 127 may be formed at the other side of the case 160.

The lithium secondary battery may be manufactured in, e.g., a cylindrical shape using a can, a square shape, a pouch shape or a coin shape.

Therefore, various implementations of features of the disclosed technology can be made based on the above disclosure, including the examples listed below. While the following examples contain many specifics, these should not be construed as limitations on the scope of any invention, and it should be understood that various alterations and modifications are possible based on the disclosed technology.

EXAMPLE 1

100 g of artificial graphite having an average particle diameter (D50) of about 7 μm and 3 g of petroleum pitch were put into a mixer (manufactured by Inoue), mixed at a stirring speed of 20 Hz for 30 minutes, and then calcined at 1000° C. to form first anode active material particle including a coating layer on a surface thereof.

A content (coating amount) of the coating layer was 1.5% based on 100 parts by a total weight of the first anode active material particles. A median value of a coating thickness estimated from the coating amount was about 10 nm. When a pressure condition was 4 kN, a pellet density measured by only including the first anode active material particles was 1.59 g/cc.

100 g of artificial graphite having an average particle diameter (D50) of about 12 μm were prepared as the second anode active material particles. When a pressure condition was 4 kN, a pellet density measured by only including the second anode active material particles was 1.69 g/cc.

60 parts by weight of the first anode active material particles and 40 parts by weight of the second anode active material particles were put into a mixer and mixed at a stirring speed of 5 Hz for 10 minutes to prepare an anode active material.

As described above, the prepared anode active material, CMC, and SBR were mixed in a weight ratio of 97.3:1.2:1.5 to prepare an anode slurry. The anode slurry was coated on a Cu foil, dried and pressed to prepare an anode having an electrode density of 1.70 g/cc.

A coin cell type secondary battery was prepared using a Li foil as a counter electrode and an electrolyte containing 1M $LiPF_6$ solution in an EC:EMC=3:7 mixed solvent.

EXAMPLES 2 TO 4

Procedures the same as those of Example 1 were performed except that amounts of the first anode active material particle and the second anode active material particle were changed as shown in Table 1 below.

A pressed density of each anode was 1.70 g/cc that was the same as that in Example 1.

EXAMPLE 5

The first anode active material particle including the coating layer on the surface thereof was prepared by the same procedure as that in Example 1, except that 4 g of petroleum pitch was mixed with 100 g of artificial graphite having an average particle diameter (D50) of about 9 μm and calcined at 1000 ° C.

A content (coating amount) of the coating layer was 2% based on 100 parts by a total weight of the first anode active material particles. A median value of a coating thickness estimated from the coating amount was about 15 nm. When a pressure condition was 4 kN, a pellet density measured by only including the first anode active material particles was 1.59 g/cc.

100 g of artificial graphite having an average particle diameter (D50) of about 18 μm were prepared as the second anode active material particles. When a pressure condition was 4 kN, a pellet density measured by only including the second anode active material particles was 1.69 g/cc.

A pressed density of the anode was 1.70 g/cc that was the same as that in Example 1.

EXAMPLE 6

The first anode active material particle including the coating layer on the surface thereof was prepared by the same procedure as that in Example 1, except that 5 g of petroleum pitch was mixed with 100 g of artificial graphite having an average particle diameter (D50) of about 9 μm and calcined at 1000° C.

A content (coating amount) of the coating layer was 2% based on 100 parts by weight of a total weight of the first anode active material particles. A median value of a coating thickness estimated from the coating amount was about 18 nm. When a pressure condition was 4 kN, a pellet density measured by only including the first anode active material particles was 1.55 g/cc.

100 g of artificial graphite having an average particle diameter (D50) of about 18 μm were prepared as the second anode active material particles. When a pressure condition was 4 kN, a pellet density measured by only including the second anode active material particles was 1.66 g/cc.

Pressed densities of the anode was 1.70 g/cc that was the same as that in Example 1.

COMPARATIVE EXAMPLES 1 AND 2

The same procedures as those discussed in Example 1 were performed except that amounts of the first anode active material particle and the second anode active material particle were changed as shown in Table 1 below. A pressed density of each anode was 1.70 g/cc that was the same as that in Example 1.

COMPARATIVE EXAMPLES 1 AND 2

The coating layer was not formed on the surface of the first anode active material particle while using the same artificial graphite as that in Example 5. A coating layer was formed on the second anode active material particle using petroleum pitch. The first and second anode active material particles were mixed in amount ratios as shown in Table 2 below. A pressed density of each anode was 1.70 g/cc that was the same as that in Example 1.

EXPERIMENTAL EXAMPLE

(1) Evaluation on High Rate Charging Property

After repeating 10 cycles of charging and discharging at a 2.0 C charge/0.33C discharge c-rate in a chamber maintained at 25° C., a retention capacity ratio was measured. The evaluation results are shown in Tables 1 and 2 below. In the measured retention capacity ratio values, all decimal places were rounded down.

TABLE 1

| | | content ratio* (wt %) | pellet density** (g/cc, 4 kN) | retention capacity ratio (%) |
|---|---|---|---|---|
| Example | 1 | 60 | 1.67 | 81 |
| | 2 | 70 | 1.74 | 85 |
| | 3 | 80 | 1.64 | 83 |
| | 4 | 90 | 1.63 | 83 |
| Comparative Example | 1 | 50 | 1.60 | 75 |

*Content ratios of the first active material particles based on a total weight of the first and second anode active material particles

**Pellet densities of the anode active material including the first and second anode active material particles with the content ratios

(2) Measurement of Pellet Density

As described above, the pellet density may be used for estimating the hardness of the first anode active material particles and the second anode active material particles. Generally, the value of the pellet density may be measured to be larger than the value of the pressed density, which indicates the density of the anode after the pressing.

For the measurement of the pellet density, a sample was compressed into pellet of a specific size by pressing with a force of 4 kN. A volume change of the pellet was calculated to measure the pellet density of the compressed sample. A specific method for measuring the pellet density is as follows.

(a) A height ($H_1$, mm) of an empty pelletizer (diameter 13 mm) (unit is mm) was measured (b) About 2±0.1 g (W) of the sample was put into a sample inlet of the pelletizer (c) The pelletizer was put on a center of a manual type presser (d) The sample was pressed until the applied pressure reached 4 kN (e) Pressed for 10 seconds, and then a height of the pelletizer (H2, mm) was measured.

The pellet density was calculated by Equation 1 below using the values obtained in the above measurement method.

$$\text{Pellet Density} = W/[\pi\times(20\text{ mm}/2)^2\times(H_2-H_1)/1000] \quad \text{[Equation 1]}$$

(3) Evaluation on Sphericity

Sphericity and high-rate filling properties (retention capacity ratio) were measured for Example 5 and Comparative Examples 3 and 4. The sphericity of the first anode active material particle included in each of Example 5 and Comparative Examples 3 and 4 was measured using a particle shape analyzer (Malvern, Morphologi 4).

Specifically, a cumulative distribution of the sphericity of the first anode active material particles was obtained using a particle shape analyzer, a sphericity (Dn50) corresponding to 50% of a distribution ratio from particles having a larger sphericity was determined as the sphericity of the first anode active material particles.

TABLE 2

| | | content ratio* (wt %) | pellet density ** (g/cc, 4 kN) | Sphericity*** (Dn50) | retention capacity ratio |
|---|---|---|---|---|---|
| Example | 5 | 70 | 1.72 | 0.914 | 85 |
| | 6 | 70 | 1.62 | 0.919 | 87 |
| Comparative | 3 | 70 | 1.66 | 0.902 | 78 |
| Example | 4 | 70 | 1.65 | 0.899 | 71 |

*Content ratios of the first active material particles based on a total weight of the first and second anode active material particles
** Pellet densities of the anode active material including the first and second anode active material particles with the content ratios
***Sphericity of the first anode active material particles Referring to Tables 1 and 2, the anode active materials of Examples provided enhanced high-rate charging properties compared to those from the anode active materials of Comparative Examples. For example, the retention capacity ratios from the anode active material of Examples exceeded 80% even after the repeated high-rate charging.

For example, Example 6 provided a high-rate charging property greater than 85%.

In Comparative Examples, the retention capacity ratios less than 80% were provided after the repeated high-rate charging.

The anode active material of Comparative Example 1 provided insufficient high-rate property due to the insufficient content of the first anode active material. In Comparative Example 2, destruction of the second anode active material and/or clogging of internal pores of the anode active material in the high-pressure pressing process for realizing the pressed density of 1.7 g/cc occurred to degrade the high-rate property.

In Comparative Examples 3 and 4, the second anode active material having a relatively high hardness was used to provide the pressed density exceeding 1.6 g/cc. However, the high-rate property was deteriorated during the high-pressure pressing process due to the insufficient sphericity.

What is claimed is:

1. An anode for a secondary battery, comprising:

an anode current collector; and an anode active material layer on the anode current collector;

wherein the anode active material layer comprises first anode active material particles and second anode active material particles, wherein each of the first anode active material particles has a single particle structure that includes a core particle and a coating layer formed on a surface of the core particle, and the second anode active material particles have an average particle diameter greater than that of the first anode active material particles, wherein a ratio of a weight of the first anode active material particles to a total weight of the first anode active material particles and the second anode active material particles is more than 50 wt % and less than 100 wt %, wherein at least a portion of the first anode active material particles and at least a portion of the second anode active material particles are in contact with the anode current collector.

2. The anode for a secondary battery of claim 1, wherein the core particle comprises a graphite-based active material, an amorphous carbon-based material, or a mixture thereof.

3. The anode for a secondary battery of claim 1, wherein the core particle comprises artificial graphite.

4. The anode for a secondary battery of claim 1, wherein the coating layer comprises an amorphous carbon-based material.

5. The anode for a secondary battery of claim 1, wherein the coating layer is formed from pitch.

6. The anode for a secondary battery of claim 1, wherein the first anode active material particles have a hardness higher than that of the second anode active material particles.

7. The anode for a secondary battery of claim 1, wherein a ratio of an average particle diameter of the first anode active material particles to the average particle diameter of the second anode active material particles is in a range from 0.3 to 0.6.

8. The anode for a secondary battery of claim 1, wherein the second anode active material particles comprise a graphite-based active material, an amorphous carbon-based material, or a mixture thereof.

9. The anode for a secondary battery of claim 1, wherein an average sphericity (Dn50) of the first anode active material particles is 0.91 or more.

10. The anode for a secondary battery of claim 1, wherein the second anode active material particles comprise artificial graphite.

11. The anode for a secondary battery of claim 1, wherein the ratio of the weight of the first anode active material particles to the total weight of the first anode active material particles and the second anode active material particles is in a range from 60 wt % to 90 wt %.

12. A secondary battery, comprising:

a cathode comprising a lithium metal oxide; and an anode for a secondary battery facing the cathode, the anode comprising:

first anode active material particles, each of the first anode active material particles having a single particle structure that includes a core particle and a coating layer formed on a surface of the core particle; and second anode active material particles having an average particle diameter greater than that of the first anode active material particles, wherein a ratio of a weight of the first anode active material particles to a total weight of the first anode active material particles and the second anode active material particles is more than 50 wt % and less than 100 wt %, wherein at least a portion of the first anode active material particles and at least a portion of the second anode active material particles are in contact with an anode current collector.

13. The secondary battery of claim 12, wherein the core particle comprises a graphite-based active material, an amorphous carbon-based material, or a mixture thereof.

14. The secondary battery of claim 12, wherein the core particle comprises artificial graphite.

15. The secondary battery of claim 12, wherein the coating layer comprises an amorphous carbon-based material.

16. The secondary battery of claim 12, wherein the coating layer is formed from pitch.

17. The secondary battery of claim 12, wherein the first anode active material particles have a hardness higher than that of the second anode active material particles.

18. The secondary battery of claim 12, wherein a ratio of an average particle diameter of the first anode active material particles to the average particle diameter of the second anode active material particles is in a range from 0.3 to 0.6.

19. The secondary battery of claim 12, wherein the second anode active material particles comprise a graphite-based active material, an amorphous carbon-based material, or a mixture of the graphite-based active material and the amorphous carbon-based material.

20. The secondary battery of claim 12, wherein an average sphericity (Dn50) of the first anode active material particles is 0.91 or more.

* * * * *